United States Patent [19]

Rainard

[11] Patent Number: 5,473,610
[45] Date of Patent: Dec. 5, 1995

[54] METHOD OF CLOCK SIGNAL RECOVERY AND OF SYNCHRONIZATION FOR THE RECEPTION OF INFORMATION ELEMENTS TRANSMITTED BY AN ATM NETWORK AND DEVICE FOR THE IMPLEMENTATION OF THE METHOD

[75] Inventor: Jean-Luc Rainard, La Terrasse, France

[73] Assignee: France Telecom, Paris, France

[21] Appl. No.: 231,024

[22] Filed: Apr. 20, 1994

[30] Foreign Application Priority Data

Apr. 22, 1993 [FR] France ................... 93 04775

[51] Int. Cl.⁶ ................................. H04J 3/24
[52] U.S. Cl. .................. 370/94.2; 370/108; 375/211; 375/356
[58] Field of Search .............. 370/94.2, 60, 94.1, 370/24, 110.1, 108; 375/3, 107, 211, 356

[56] References Cited

U.S. PATENT DOCUMENTS

| | | | |
|---|---|---|---|
| 4,172,963 | 10/1979 | Belcher et al. | 370/24 |
| 4,780,889 | 10/1988 | Ley et al. | 375/3 |
| 4,977,582 | 12/1990 | Nicholo et al. | 370/108 |
| 5,063,575 | 11/1991 | Annamalai | 370/94.2 |
| 5,172,396 | 12/1992 | Rose, Jr. et al. | 375/107 |
| 5,197,064 | 3/1993 | Chao | 370/60 |
| 5,327,428 | 7/1994 | Van Ao et al. | 370/94.2 |

FOREIGN PATENT DOCUMENTS

| | | |
|---|---|---|
| 0071425 | 2/1983 | European Pat. Off. . |
| 0168330 | 1/1986 | European Pat. Off. . |
| 2171577 | 8/1986 | United Kingdom . |
| 2086106 | 5/1989 | United Kingdom . |

Primary Examiner—Douglas W. Olms
Assistant Examiner—Shick Hom
Attorney, Agent, or Firm—Nilles & Nilles

[57] ABSTRACT

A clock signal recovery and synchronization method for the reception of information elements transmitted by an ATM network and a device for the implementation of this method. The clock signal recovery is done by the reception of data elements by means of a local clock signal HL with a frequency equal to the frequency of transmission, the rephasing of the data elements being done only after a wait for the presence, on one and the same phase signal, of several fronts or edges of phase signals of the transmitted data that are coherent with a clock pulse HL and by choosing, as a rephasing signal, the phase signal that meets this condition and that frames the clock pulse. The resynchronization is done by the recognition of the resynchronization word with, possibly, a correction of errors in this word. To rephase the transmitted data, a rephasing circuit uses a delay line for generating phase signals and an edge detection circuit for detecting edges of the phase signals that are coherent with the local clock signal. Preferably, the rephasing circuit includes as many flip-flop register stages as there are errors to be corrected in the data. To resynchronize the data for recognizing a delimiter in a precursor of the data, a resynchronization circuit having a series recognition register is used. To correct errors in the delimiter, the resynchronization circuit preferably has stages of registers offset by one bit and connected by logic gates to the series recognition register.

24 Claims, 8 Drawing Sheets

METHOD OF CLOCK SIGNAL RECOVERY AND OF SYNCHRONIZATION FOR THE RECEPTION OF INFORMATION ELEMENTS TRANSMITTED BY AN ATM NETWORK AND DEVICE FOR THE IMPLEMENTATION OF THE METHOD

BACKGROUND OF THE INVENTION

1. Field of the Invention

The invention relates to a method of clock signal recovery and synchronization for the reception of information elements transmitted in bursts by an ATM network. It also relates to a device for the implementation of the method.

It may be recalled, first of all, that an ATM (Asynchronous Transfer Mode) network enables the transmission of digital elements having various bit rates that could be high: indeed these bit rates could go up to 622 megabits per second and more.

Transmission in ATM mode is done by the transfer of information elements of constant length. The elementary quantity of information elements transmitted is equal to 48 bytes. The information block transmitted in ATM is called a "cell" and is identified by a five-byte label called a header. The total length of a cell is therefore equal to 53 bytes.

The invention can be applied especially to the recovery of clock signals and to synchronization for the reception of cells such as these transmitted in bursts on a network.

2. Description of the Prior Art

The reception of ATM cells transmitted in burst mode raises particular problems of clock signal recovery and synchronization. Indeed, in this burst mode of transmission, the cells are phase-shifted with respect to one another and are separated by periods during which the transmission channel is at rest. The rephasing and the resynchronization should therefore be done systematically at each new cell. To carry out these two operations, a method has been devised for preceding the cell proper by a sequence of bits that are called a precursor. This precursor has two parts processed independently by presently used reception systems in such a way as to obtain these two clock signal recovery and resynchronization operations. Of the two parts forming the precursor, one is called the preamble and the other is called the delimiter.

The preamble is used solely for the rephasing of the incoming cell. To this end, the receiver system receives a train of data elements that is a random binary train encoded by an NRZ type encoding controlled at transmission by a clock signal HE having the frequency F. This clock signal is not transmitted with the data elements. However, at reception, there is available a local clock signal HL having the frequency F' equal to F or very slightly different from F, without any phase relationship with the clock signal HE. It is therefore necessary, at reception of the data train, to delay these data elements at input so as to rephase them properly with the local clock signal HL. The delay to be introduced is not the same for all the data elements for they generally come from transmitters located at different distances. The delay should therefore be recomputed at the start of each cell. To make it possible to carry out this operation swiftly and efficiently, the preamble comprises numerous edges and generally has the following form: 101010 ... 010101.

However, the rephasing system does not have instantaneous effect, and the beginning of the preamble often shows reception errors, bits having been omitted or even duplicated at output of the rephasing system. Given the extremely repetitive nature of the preamble, it is impossible to know how many bits have been lost and hence that bit of the preamble from which the reception actually begins.

The preamble makes it possible to carry out the "bit" rephasing but not the "byte" rephasing (or resynchronization).

The preamble is even more accentuated when there are transmission errors in the preamble.

The delimiter, for its part, is designed to carry out the operation of resynchronization. It is a known binary word that is inserted between the preamble and the cell proper, and the recognition of this delimiter makes it possible to have knowledge, unambiguously, of that bit of the data train at which the first byte of useful information begins. Unfortunately, should there be any error during the transmission of the delimiter, it will not be possible to carry out the byte synchronization and the cell will be lost.

In the even of error in the transmission line, the difficulties will be further increased by the fact that the size of the precursor must be as small as possible so as not to cause deterioration in the useful bit rate of the channel.

Thus, so as not to cause any deterioration in the useful bit rate of the channel, it is necessary for the precursor to be short. The rephasing should consequently be done very speedily. This rules out resorting to analog techniques that are used in a standard way in DC mode (filtering, PLL) for which preambles of more than about ten bits are necessary.

The possible presence of transmission errors among the bits used for the rephasing and for the resynchronization therefore entails the risk of a loss of cells, this risk being all the greater as this information is less redundant because of its brevity.

Presently existing systems, used to carry out these rephasing and resynchronization operations do not take account, in practice, of the possible presence of transmission errors. We may, however, cite the publication (ISH 91) by A. ISHIKURA et al. of the firm NTT entitled "A cell-based multipoint ATM transmission system for a passive double-start access network", IEEE Workshop on Local Optical Networks, September 91, Tokyo Art. G.3.3., on a system that enables the correction of a single error (i.e. one error bit) in the delimiter. However, the approach provided by this system cannot be used to resolve all the problems encountered by the Applicant.

SUMMARY OF THE INVENTION

The present invention is aimed at overcoming these drawbacks. Indeed, the present invention makes it possible to propose a method of clock signal recovery and data synchronization that is extremely reliable, even in the presence of errors. To this end, the method consists of the rephasing of the data elements only after awaiting the occurrence of several edges that are coherent with a local clock pulse in one and the same phase signal. The method also consists, for the synchronization of the data elements, in carrying out a correction of the errors that appear in the precursor binary train and, more particularly, in the resynchronization word.

An object of the invention is a method of clock signal recovery and synchonization of data transmitted in asynchronous temporal transmission mode and occurring in the form of information cells, preceded by a binary train wherein chiefly to carry out these functions, even in the presence of transmission errors, said method consists in:

carrying out the reception on the basis of a local clock signal HL, having a period T, the frequency of this clock signal being substantially equal to the transmission frequency;

introducing delays with a duration of T/k on the received binary train to obtain several phase signals;

awaiting the presence, on one and the same phase signal, of several fronts that are coherent with a clock pulse HL;

choosing, as a data rephasing signal, the phase signal that meets the previous condition and frames the clock pulse;

rephasing the data elements with this phase signal;

recognizing a resynchronization word in the precursor binary train to synchronize the reception of the data elements.

According to another characteristic of the method, the resynchronization is done with a correction of transmission errors on the precursor binary train and the generation of a synchronization square-wave signal Cs during a period in which the synchronization word called a "delimiter" is likely to appear.

According to another characteristic of the invention, to prevent any premature and false recognition of the delimiter (which is assumed to have a length D), the synchronization square-wave signal Cs is sent out only if each sequence Si of D bits to be analyzed, obtained by successively taking, as a starting point, each of the bits included between the rise of Cs and the effective beginning of the delimiter, differs from the delimiter by at least 2N+1 bits, N being the number of transmission errors that can be corrected.

According to another characteristic of the invention, the precursor binary train has a preamble and a delimiter that overlap partially.

According to another characteristic of the invention, the delimiter and the preamble overlap entirely.

An object of the invention is also a device-for clock signal recovery and for synchronization of data elements transmitted in asynchronous temporal transmission mode and occurring in the form of information cells preceded by a precursor binary train wherein chiefly said device comprises:

a) a rephasing circuit capable of rephasing the data elements even in the presence of transmission errors, said circuit comprising:

a delay line to introduce phase delays on each pulse of the data train. Each delay has a duration T/k where T is the period of the local clock signal HL;

means for the detection of the edges coherent with the clock pulses and of the error corrections that appear in the preamble of the train of precursor data elements;

b) a resynchronization circuit designed for the recognition, in the precursor train, of the delimiter when there are transmission errors in this delimiter, this circuit comprising, to this end, means for the correction of errors in the delimiter.

According to another characteristic of the invention, the error correction detection means of the rephasing circuit include as many flip-flop register stages as there are errors to be corrected, these registers being connected to one another by logic gates so as not to store the detection of an edge unless an edge corresponding to the same phase has already been stored in the register of the preceding stage.

The rephasing circuit furthermore comprises an edge register that stores an edge only if this edge has already been stored in the preceding stages on the same phase, the first edge that reaches the edge register determining the definitive phasing and stopping the phase-seeking process.

According to another characteristic, the device furthermore comprises means that activate the stopping of the process of phase-seeking and of selecting the phase signal enabling the rephasing of the data elements.

According to one embodiment, the means that activate the stopping of the phase-seeking process comprise an OR logic gate.

According to another characteristic of the invention, the phase signal selection means comprise a multiplexer with wired priority preventing the simultaneous propagation of two phases and selecting that phase, of the valid phases, that is furthermost to the right or furthermost to the left.

According to another characteristic of the invention, the multiplexer has a pipeline structure so as to increase its working frequency.

According to another characteristic of the invention, when the preamble and the delimiter overlap, the multiplexer includes storage means at input to store the bits common to the preamble and the delimiter pending the selection of the appropriate rephasing signal.

The storage means are formed by storage registers.

According to another characteristic of the invention, the resynchronization circuit includes a series recognition register with a length equal to that of the delimiter to which there are connected, by means of logic gates, N other registers offset by one bit, N being the number of errors to be corrected in the delimiter.

BRIEF DESCRIPTION OF THE DRAWINGS

Other features and advantages of the present invention shall appear from the following description, given by way of a non-exhaustive illustration, and from the appended figures, of which.

MORE DETAILED DESCRIPTION

Figure 1:
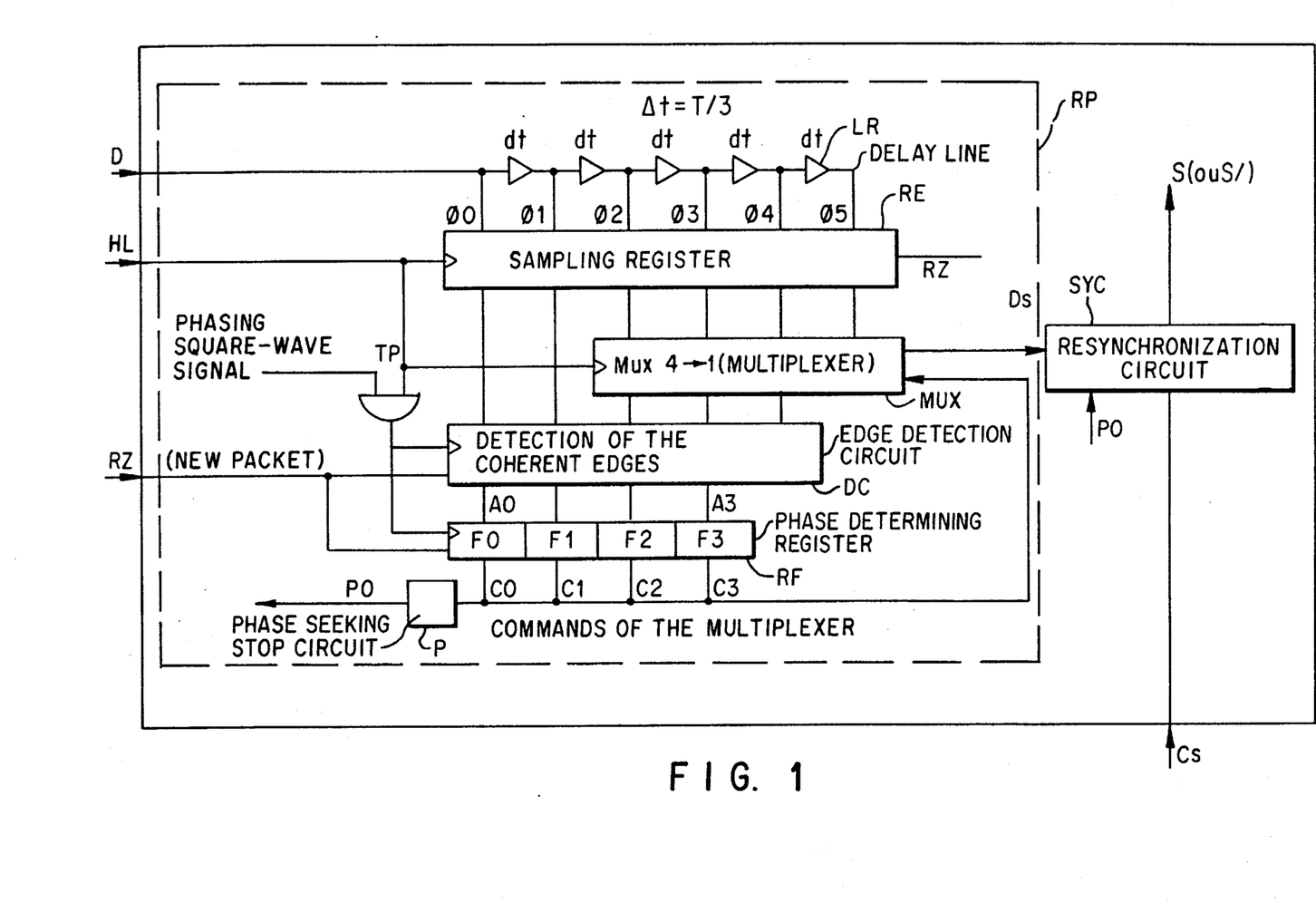
FIG. 1 shows a rephasing and synchronization device according to the invention.

FIG. 1 shows a rephasing and resynchronization device according to the invention. This device has a rephasing circuit RP, also called a phasor. This phasor has a delay line LR that can be used to introduce a series of k delays dt with a value T/k shifting the incoming signal D. The outputs resulting from these delays correspond to the data element D phase-shifted by T:k, 2T/k, ..., (k−1)T/k, T. The incoming data element D corresponds to the precursor binary train. T corresponds to the period of the local clock signal HL.

In the example of FIG. 1, the delay line is formed by five elements whose propagation time is equal to T/3. There are thus obtained the signals Φ1, Φ2, Φ3, Φ4 and Φ5 corresponding to D delayed by 0, T/3, 2T/3, T, T+T/3, T+2T/3. These signals are picked up in a sampling register RE on the leading edge of the local clock signal HL. The first four bits D0 to D3 provide knowledge of the location of the edges of the data element D with respect to those of the clock signal HL. For example, if D0 to D3 are equal to 0111, then it is deduced therefrom that the edge of the data element D is located in the first third of the period of the clock signal HL.

The phasor according to the invention further comprises means DC for the detection of the coherent edges and for the correction of errors.

These means make it possible to await the detection of several coherent edges, i.e. edges that appear in the same signal Φ1, before validating the phasing.

The phasor also comprises an edge register RF generating control signals, one of these signals enabling the data element to be rephased.

The phasor further comprises a multiplexer MUX controlled by the control signal generated by the edge register RF and giving the rephased data element Ds.

Figure 2:
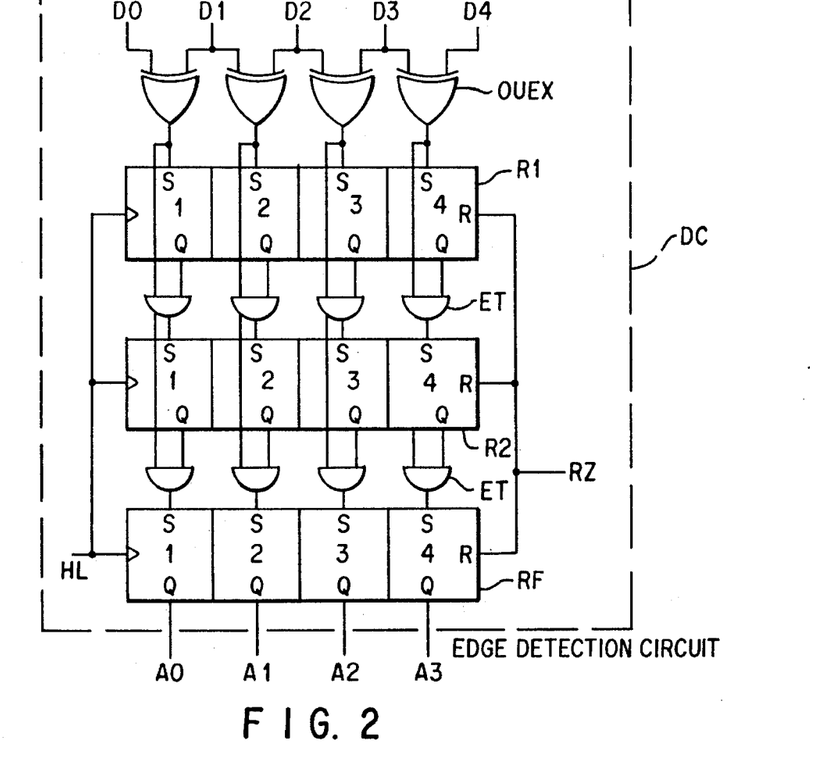
FIG. 2 shows means for the detection of the edges of the rephasing circuit with two-error correction.

The edge detection and correction means DC are shown in greater detail in FIG. 2. According to the exemplary embodiment given, these correction means can be used to correct two errors. The term "error" is taken to mean an error occuring in one bit of the incoming signal. When several bits are affected simultaneously, it is considered that there are several errors.

Figure 3:
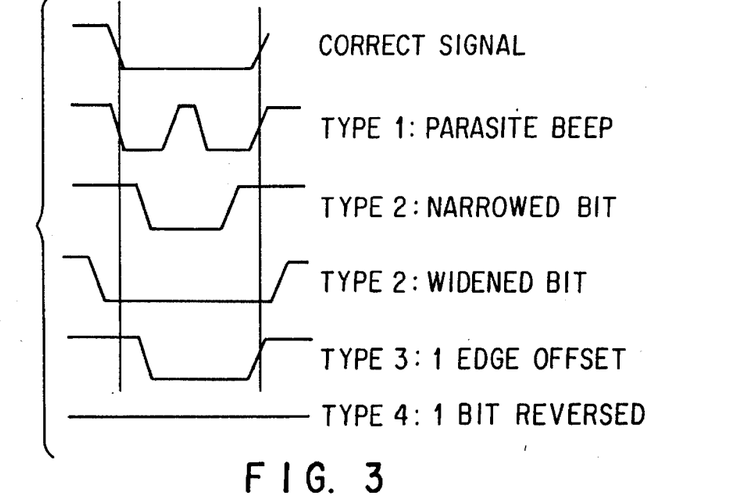
FIG. 3 shows the different types of errors.

The different types of errors that may arise have been shown in the diagram of FIG. 3. The type 1 errors take the form of the appearance of a parasitic beep (which may be positive or negative) in the middle of a bit of the signal (an error of this type occurring during the preamble of the precursor prompts the appearance of two additional error edges).

The type 2 errors prompt the inward or outward shifting of the two edges of the bit. In this case, two of the correct edges disappear and are replaced by two error edges.

The type 3 errors cause the shifting of one of the edges of the bit of the preamble: one correct edge disappears and yields in its place an incorrect edge.

Finally, the type 4 errors prompt the disappearance of one bit: two correct edges disappear without any incorrect edge being created.

The most serious errors correspond to type 2 errors. These are the errors that reduce the number of correct edges to the greatest extent while at the same time increasing the number of incorrect edges to the greatest extent. The phaser according to the invention makes it possible to validate the phasing edge only if it has been observed P times at the same location by the edge register.

However, the correct edges may very well be at the boundary between two adjacent positions because of inevitable jitter during transmission. They will then get distributed randomly on two adjacent bits of the register.

Thus, according to the invention, a choice is made of an elementary delay dt that is sufficient (the jitter for its part being sufficiently low) to make it impossible for a correct edge to appear on more than two adjacent bits. In the worst case, there should be 2P−1 correct edges available in the preamble to carry out the phasing (P−1 in one of the flip-flops and P in the neighboring one).

To tolerate or withstand N errors of the type 2 in the preamble, if F is the number of edges contained in the preamble, the following two conditions must be met:

N smaller than P (if not, the operation could possibly be based on an error edge);

F−2N≧2P−1 (this is necessary in order that there may be a sufficient number of correct edges remaining for the phasing).

Taking P=N+1, we get F≧4N+1, this being a necessary and sufficient condition for the system to work under the specified conditions.

In the example of the presence of two errors, the preamble must contain nine transitions to obtain a rephasing. For this purpose, the operation entails waiting for an edge or front to be observed thrice at the same location.

The edge detection circuit shown in FIG. 2 can be used to obtain this result. For this purpose, this circuit has a set of exclusive-OR logic gates OUEX with two inputs and one output and RS type flip-flop register stages connected to one another by AND type gates. The number of RS flip-flop register stages is chosen as a function of the number of errors to be corrected by means of this circuit.

In the exemplary embodiment shown on the basis of this figure, two registers are used, namely the register R1 and the register R2: the circuit thus enables the correction of two errors. The AND gates that enable the register R1 to be connected to the register R2 as shown in this FIG. 2 are gates with two inputs and one output. The second series of AND gates connects the register R2 to a flip-flop register, hereinafter called an edge register RF.

The flip-flops forming the registers R1, R2 and the edge register RF are RS type flip-flops and work as described here below.

When the contents of the flip-flop are equal to 1, only one reset command applied to the asynchronous resetting input R of these flip-flops is capable of resetting this input. The input S is synchronous. It is stored on a leading edge of the local clock signal HL.

Figure 4:
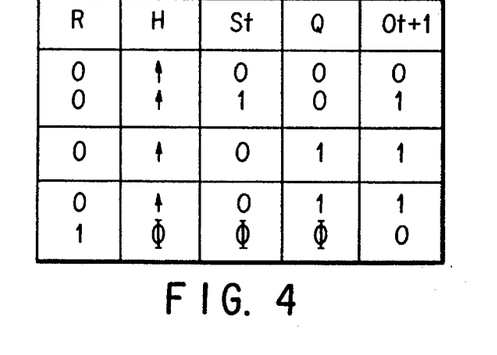
FIG. 4 is a table showing the state of the flip-flops forming the registers of each stage.

The table shown in FIG. 4 can be used to illustrate the states of the flip-flops forming the registers R1, R2 and the edge register RF. The registers R1, R2 and RF are reset before the beginning of the cell by a signal RZ given to the circuit. An edge of the preamble, arriving for example between D1 and D2, is stored in the flip-flop 2 of R1. A second edge arriving at the same place in the period will then reach the flip-flop 2 of R2 and a third edge will finally place the flip-flop 2 of the register RF at 1. The edges placed at other locations in the period are stored in other flip-flops. As soon as any one of the flip-flops of the edge register is reached, the phasing is considered to be ended.

Thus, the edges are detected by means of the exclusive-OR gates and stored in the two intermediate registers R1 and R2, and then in the edge register RF. An edge cannot be stored in the register R2 unless an edge corresponding to the same phase has already been stored in the register R1. Similarly, an edge cannot be stored in the edge register RF unless a similar edge has been loaded into the register R2.

Any edge appearing in RF has therefore been detected at least three times in the same phase, thus enabling the elimination of two error fronts whatever may be their phase. The first phase reaching the register RF determines the definitive phasing and stops the phase-seeking process by the generation of a signal P0. This signal is generated by the circuit bearing the reference P in this figure.

Figure 8:
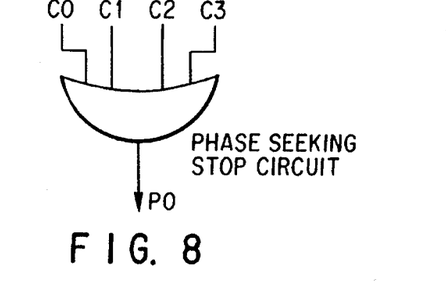
FIG. 8 exemplifies an embodiment of the circuit P.

The circuit P can be formed, for example, by means of an OR gate with four inputs and one output, as shown in FIG. 8.

Figure 9:
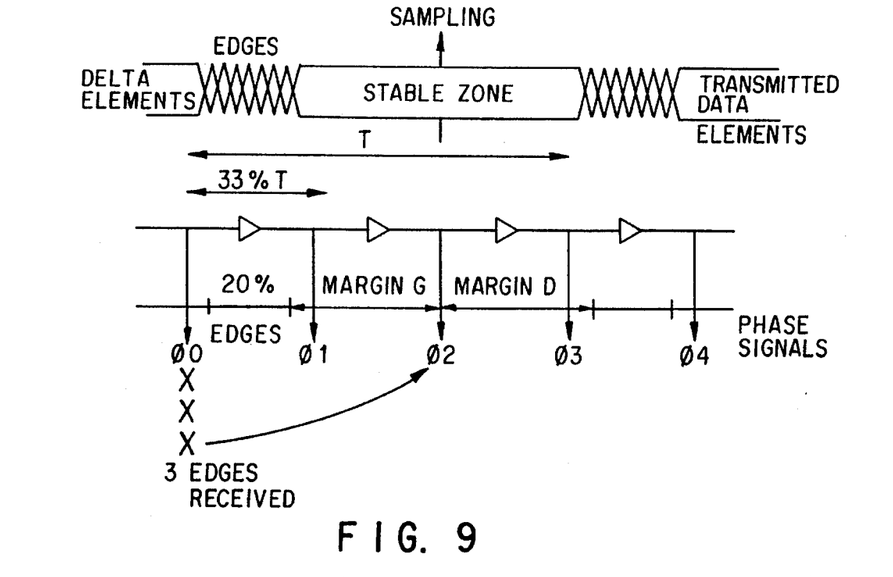
FIG. 9 is a diagram illustrating the phasing in an ideal case.

In practice, when the selected edge corresponds to a phase Φ1, the phase that is chosen for the sampling of the data elements will be the phase Φ1+2. Indeed, this choice of a sampling phase is justified in the following way:

it is assumed that the data elements at input are sent out with a clock signal of the same frequency as the clock signal HL but with a different phase, and that they are liable to have undergone some deterioration involving, for example, a dissymmetry between the duration of a bit at zero and a bit at one, or again some jitter. These defects determine an edge zone on each period of bits, it being possible for the passage from one bit to the next one to occur at any place in this zone, and they also determine a stable zone as can be seen in FIG. 9. In the example shown in this FIG. 9, the signal is not excessively disturbed and the edge zone represents only 20% of the period T.

To carry out the sampling, this sampling should take place in the stable zone and, preferably, at the center of this zone in order to simplify any computation of the choice of the phase. Thus, it will be chosen to carry out a sampling in the stable zone while keeping a sufficient margin.

In the case shown in FIG. 9, which is the most favorable case, the edge zone which represents 20% of the period T is entirely contained in one of the delays of the delay line which represents 33% of the period T. At the third correct edge of the precursor, the corresponding bit of the phase Φ0 goes to 1. The sampling phase chosen may therefore be the phase Φ2. It is seen that, in this extremely favorable case, the sampling is done approximately at the center of the stable zone.

Figure 10:
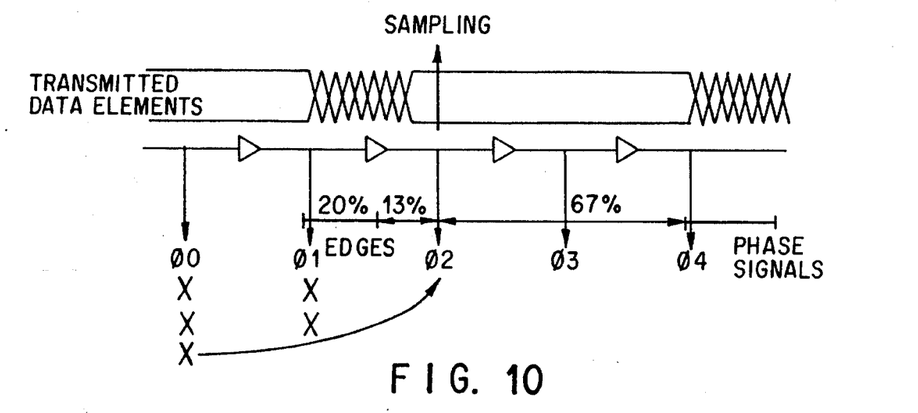
FIG. 10 is a diagram illustrating the phasing in one of the most critical cases.

In the example shown in FIG. 10, which is that of the most unfavorable case, the edge zone straddles two elements of the delay line so that it encroaches only slightly on the first delay. Under these conditions, the correct edges are distributed over the phases Φ0 and Φ1. If it is further assumed that, by mischance, the phase Φ0 receives three valid edges before Φ1, the chosen phase under these conditions is the phase Φ2. The sampling done is less well centered but there is still a margin equal to 13% that is quite acceptable. In the other unfavorable cases, the sampling is done with a margin that is not smaller than this margin which has been fixed to obtain a satisfactory result.

Figure 5:
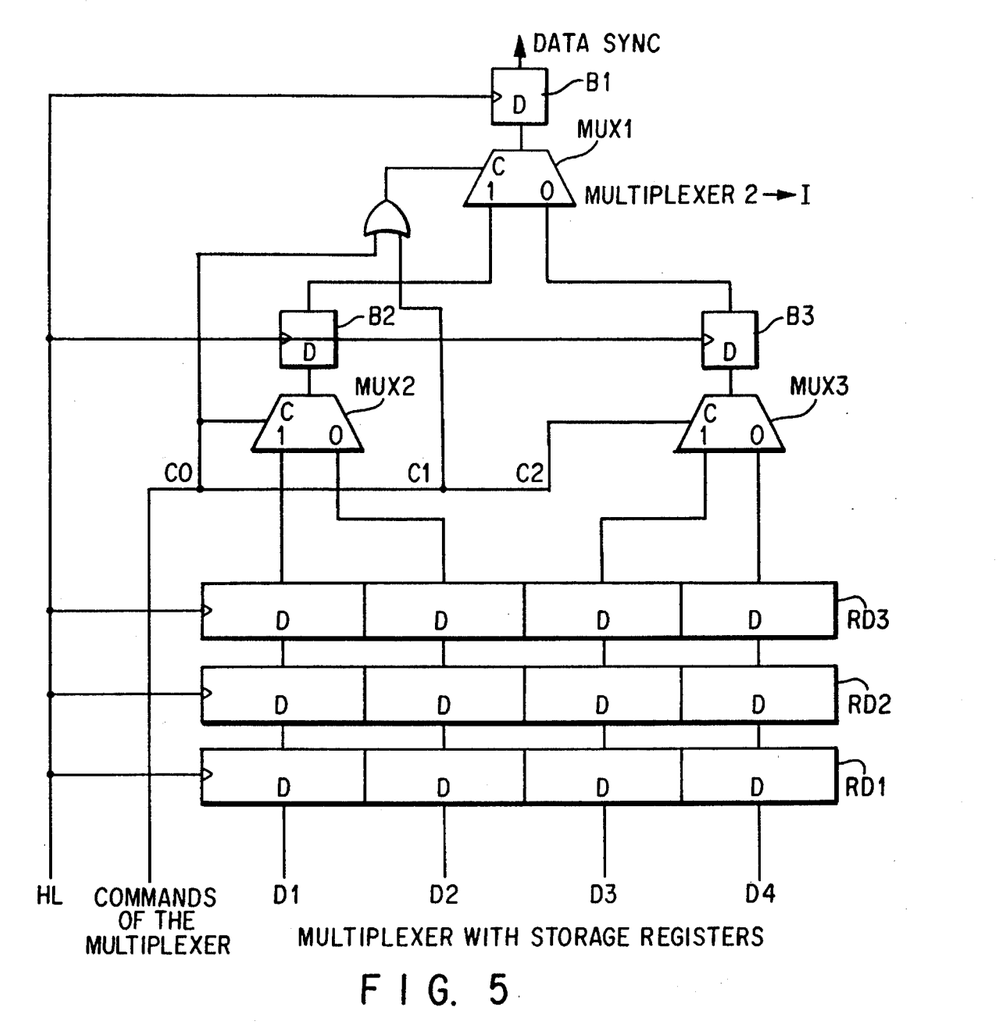
FIG. 5 exemplifies a structure of a multiplexer of the rephasing circuit according to one embodiment.

FIG. 5 shows an exemplary embodiment of the multiplexer according to the invention.

The multiplexer has, according to the invention, a system of wired priority, a pipeline structure and a storage system at its inputs, the storage being necessary only to the extent that the preamble and the delimiter overlap.

The multiplexer MUX is connected to the outputs of the edge register C0, C1, C2, C3. The wired priority enables the prohibition, through the multiplexer, of the simultaneous propagation of two corresponding phases. In the exemplary embodiment shown in this FIG. 5, the wired priority enables the selection of only that phase, among the valid phases, which is furthest to the right, irrespectively of the number of these valid phases. This problem of the simultaneous propagation of two phases indeed arises because it is not always easy to impose a total delay, exactly equal to the period of the clock signal, on the delay line. And hence, for this purpose, it is seen to it that the total delay is slightly greater than the period, even if the delay line has to be extended to have a sufficient number of samples per clock signal period. It therefore becomes possible that the same edge will be stored twice in the edge detection system if this edge is located at the very beginning of the period (in practice in the flip-flops 1 and 4). The wired priority therefore enables this problem to be resolved.

Furthermore, it has been chosen to use a pipeline structure in order to increase the working frequency by reducing the number of logic layers crossed between two clock signal beeps. The pipeline structure is formed by D type flip-flops B1, B2, B3 and multiplexers MUX1, MUX2, MUX3 in the figure.

As already stated, the multiplexer shown in this figure also has a storage system comprising registers. The number of storage registers is a function of the number of common bits between the preamble and the delimiter.

Should it be chosen to have a delimiter and a preamble that overlap, it becomes necessary, during the phasing, not to lose the bits common to the two functions. The phasor proposed herein enables the passing of the information starting from the point in time when the phasing is correct, the bits that have enabled the phasing to be done being erased.

To recover these bits therefore, according to the invention, a memory of sufficient depth has been interposed between the sampling register and the inputs of the multiplexer itself. The four possible phases for each of the bits common to the preamble and to the delimiter are stored, pending the time when the processing of the preamble will enable the right phase to be chosen. The depth of the memory needed is hence equal to the number of common bits.

This memory is formed, in this exemplary embodiment, by the three flip-flop registers RD1, RD2, RD3.

Figure 6:
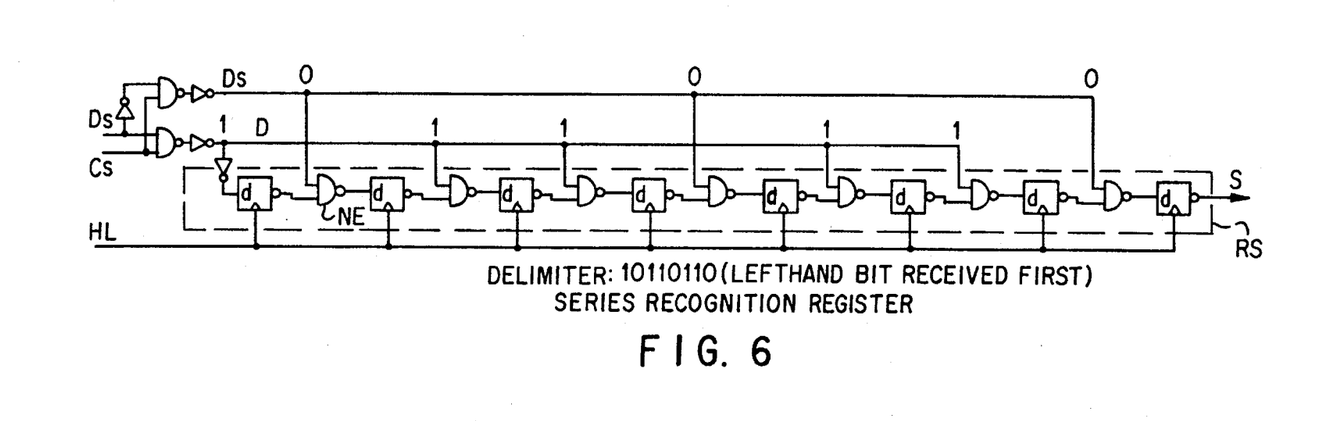
FIG. 6 shows means of synchronization according to a practical embodiment.
Figure 7:
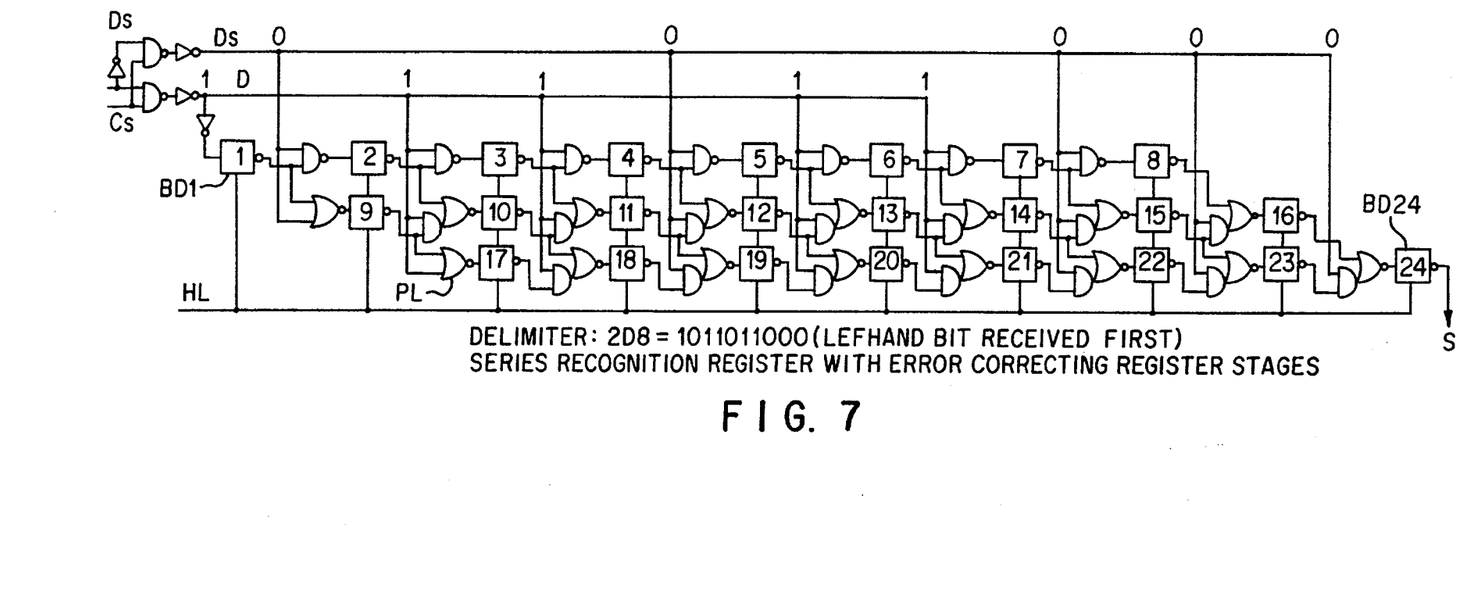
FIG. 7 shows means of synchronization according to a second practical embodiment.

Reference shall now be made to the drawings of FIGS. 6 and 7. FIG. 6 shows a synchronization circuit SYC that can be used to detect the resynchronization word, conventionally called a delimiter, in the received binary train. This circuit receives the rephased serial data element Ds at its input. It also receives a synchronization square-wave signal Cs that can be generated internally as soon as the phasing has been done, i.e. as soon as a one is present in the edge register, and the duration of this square-wave signal may be fixed by a time-lag Ts so that, for example, the square-wave signal falls again before the end of the cell.

The circuit shown in FIG. 6 corresponds to a preferred series type of embodiment. To this end, it comprises a series of D type flip-flops connected to one another by NAND logic gates referenced NE. The number of flip-flops depends on the number of bits of the chosen delimiter. In the example of a delimiter equal to B6 in hexadecimal notation (10110110) when the input Ds receives a 1 (first bit of the delimiter), the first flip-flop of the register is loaded at 1. If the next bit (the second bit of the delimiter) is equal to 0, then the next flip-flop too goes to 1. If not, it remains at 0. This sequence gets propagated until the last flip-flop is reached. This can happen only if the delimiter has been received in its entirety at the input Ds. As such, this circuit does not correct the transmission errors. A damaged delimiter will not be recognized.

According to a preferred embodiment, a series synchronization circuit, enabling the correction of errors, is used. An exemplary embodiment of a circuit such as this is given in the drawing of FIG. 7. This particular exemplary embodiment enables a correction of two errors in the delimiter.

The synchronization circuit has three series type flip-flop register stages. According to the invention, one series flip-flop stage is added for each error to be corrected. This circuit therefore, as compared with the circuit shown in FIG. 6, makes it possible to correct two errors that appear in the delimiter. The circuit shown in this FIG. 7 has 24 flip-flops referenced BD1 to BD24 and one logic circuit sending signals to the inputs of the flip-flops formed by logic gates PL such as those shown in this figure. This embodiment makes it possible to recognize a delimiter equal to 2D8 in hexadecimal notation, namely the sequence 101 1011 000.

An explanation shall now be given of the working of this circuit. It is assumed that the sequence 101 (the first three bits of the delimiter) has been received. The flip-flops BD1, BD2, BD3, BD9, BD10 and BD17 are then at 1. If the next bit is equal to 0, i.e. if there is an error in the delimiter, then the flip-flop BD4 remains at 0, thus breaking the chain of recognition of the first register. However, the flip-flops BD11 and BD18 go all the same to 1, and the associated chains remain valid.

It is assumed now that the right bits 011 are received. The flip-flops BD12, BD13, BD14 as well as the flip-flops BD19, BD20 and BD21 successively go to 1. The arrival of a second error (next bit=1) invalidates the second register, the flip-flop BD15 remains at zero and only the third register remains valid. The flip-flop BD22 is at 1. A third error is needed to break the process definitively. The arrival of a 1 in the flip-flop BD24 means that a delimiter containing two errors at most has been recognized.

According to the invention, another register will be added to correct an additional error and so on and so forth. A circuit such as this furthermore works at high speed since there are few logic layers between two clock signal beeps and since the necessary logic gates have few inputs.

According to the invention, a synchronization square-wave signal Cs is chosen so that the circuit SYC is active for a period of time during which the delimiter is likely to occur. If this signal is very precise, i.e. if it frames the delimiter exactly, then there is no problem and any delimiter is suitable. However, in the real cases, this signal precedes the delimiters by a certain number of unknown and variable bits. It is indeed fairly difficult to generate it with precision, at least for high transmission frequencies (150 to 622 MHz or even more). There is then a risk of premature and erroneous recognition of the delimiter, and this risk is all the greater as the synchronization square-wave signal is wider and as the error correction is more powerful. The example given here below will provide for a clearer understanding of this phenomenon.

Figure 14:
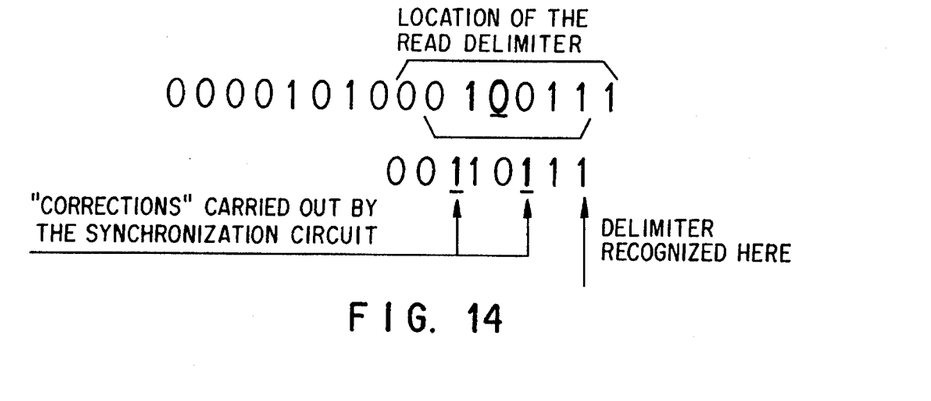
FIGS. 14, 15, 16 and 17 shows examples of a synchronization word.

Let us take the example of a precursor formed by a preamble that is equal, for example, to the sequence 10101010 and a delimiter equal to the sequence 0110111 without overlapping, and a synchronization circuit capable of tolerating two errors. If an error affects the bit 4 of the delimiter, then the precursor received at the input of the circuit is equal to 1010101000100111. Assuming that the phasing is done in five edges (which is the worst case when there is no error), the synchronization circuit will receive 0000111000100111. Now, this sequence of bits contains a configuration that is mistaken for the delimiter, one bit before the end of the real delimiter as can be seen in FIG. 14.

Figure 15:
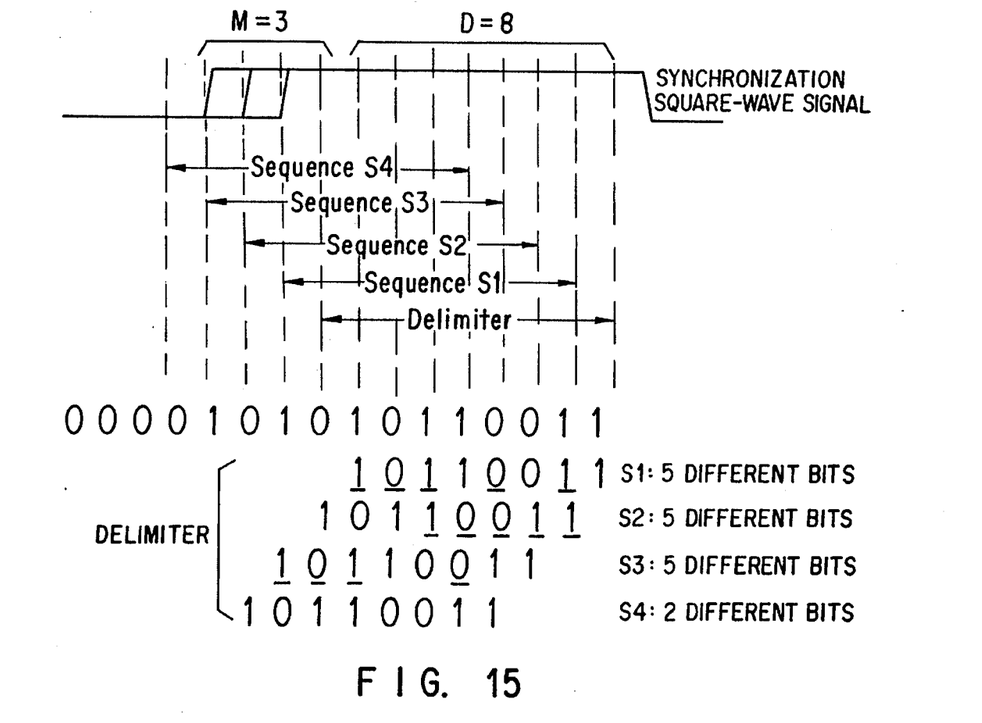

The system works in the presence of errors when the synchronization square-wave pulse frames the delimiter exactly, which is a condition that may be relatively difficult to obtain. To overcome this drawback, it is possible to lay down the following condition 1 in the choice of the delimiter: if D is the length of the delimiter and if the square-wave signal Cs starts Mbits before the effective start of the delimiter, then each sequence Si of D bits obtained in taking, as the starting point, each of the M bits preceding the delimiter must differ from the delimiter by at least 2N+1 bits, N being the number of errors that it is sought to tolerate. For example, taking a delimiter equal to B3 in hexadecimal notation (10110011), the examples shown in FIG. 15 are obtained.

The sequences S1, S2, S3 will meet the above condition, but not the sequence S4. Consequently, the synchronization square-wave signal could start without problems at any time whatsoever between the beginning of S3 and the beginning of the delimiter but not before the beginning of S3. The position of the end of the synchronization square-wave signal becomes far less critical if it is decided to consider the first synchronization obtained as being correct and no longer to take account of the subsequent synchronizations. It is then enough for the square-wave signal to fall before the end of the cell.

It will be preferred sometimes to further increase the margin relating to the beginning of the square-wave signal. To this end, it is advantageous to resort to precursors in which the preamble and the delimiter overlap at least partially.

Figure 16:
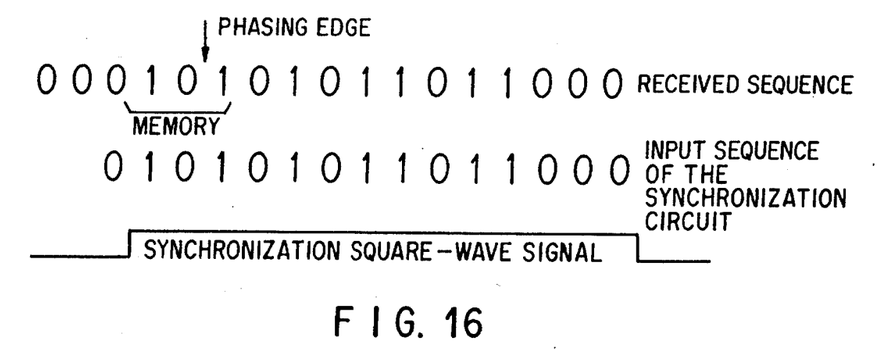

A preferred embodiment will use an internally generated square-wave signal that starts as soon as the phasing is done (as soon as there is a 1 present in the edge register) and that has its duration fixed by a time-lag with a fixed value that is not of critical importance. (It is enough, for this purpose, that the square-wave signal should fall back before the end of the cell). Should the synchronization system be capable of correcting two errors (N=2) it would be possible to use a precursor equal to AAD8 in hexadecimal notation, namely 1010101011011000, the first nine bits of which form the preamble and the last ten bits of which form the delimiter. The delimiter and the preamble have three bits in common, and the memory of the multiplexer therefore has a depth equal to 3. In the best case, the phasing can be done as soon as the third edge appears, as indicated with reference to FIG. 16.

Figure 17:
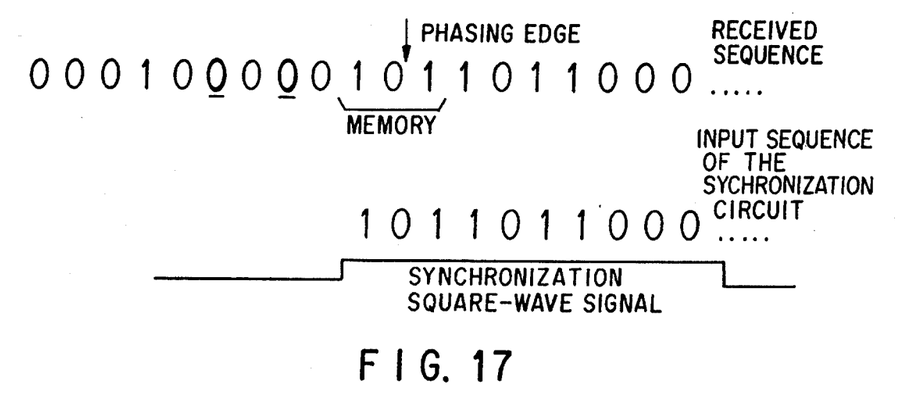

In the event of a double error in the preamble, it is possible that the phasing will be done only after the ninth edge as indicated in FIG. 17.

The precursors chosen will preferably be those that fulfill the conditions stated here above. Indeed, if the delimiter possesses D bits and if the system must tolerate N errors, then each sequence Si of D bits, obtained in taking, as the starting point, the beginning of the best-case sequence and then each of the following bits until the one that precedes the delimiter, must differ from the delimiter by at least N+1 bits. By way of an example, some precursors meeting this condition shall be given here below:

EXAMPLE OF PRECURSORS TOLERATING ONE ERROR 101001 (Hexa 29)=Minimum size (6 bits). The delimiter and the preamble both have 6 bits: they overlap entirely, and the memory depth is equal to 6 bits.

110101 (Hexa 35)=Properties identical to the above.

10101100 (Hexa AC)=Size 1 byte. The preamble covers the first five bits, and the delimiter the last five bits. The memory depth is equal to 2.

1010101100 (Hexa 2AC)=Size 10 bits. This is the smallest precursor having a delimiter (first five bits) and a preamble (five last bits) without overlapping. No memory therefore is necessary.

EXAMPLE OF PRECURSORS TOLERATING TWO ERRORS 10101001001 (Hexa 549)=Minimum size (11 bits). The delimiter and the preamble both have 11 bits: they overlap entirely, and the memory depth is equal to 11.

11010010101 (Hexa 659)=Properties identical to the above.

11010101001 (Hexa 6A9)=Properties identical to the above.

11011010101 (Hexa 6D5)=Properties identical to the above.

1010101011011000 (Hexa AAD8)=Size 2 bytes The preamble covers the first nine bits, and the delimiter the last ten bits: the memory depth is equal to 3.

101010101001110100 (Hexa 2AA74)=Size 18 bits It is the smallest precursor having a delimiter (9 first bits) and a preamble (9 last bits) without overlapping.

EXAMPLES OF PRECURSORS TOLERATING THREE ERRORS 1001010101001101 (Hexa 654D)=Minimum size (2 bytes). The delimiter and the preamble both have 16 bits: they overlap entirely and the memory depth is equal to 16.

101010101010100001101110100 (Hexa 5554374)=Size 27 bits. This is the smallest precursor having a delimiter (first 13 bits) and a preamble (last 14 bits) without overlapping.

Should precursors meeting the condition 1 be chosen, it is not absolutely necessary to give the circuit a synchronization square-wave signal. However, this circuit should be sent a signal at the beginning of the cell. Indeed, the recognition of the delimiter alone is not enough to ensure the synchronization for there is an excessively high risk that this synchronization will be imitated (plus or minus N bits) by means of a sequence of data elements internal to those of the cell.

This signal relating to the beginning of a cell, sent between two successive cells, tells the circuit that it should go into phase-seeking mode. As soon as there is a rephasing, this rephasing triggers the search for the delimiter. Inasmuch as the number of errors present in the precursor does not exceed the capacities of resistance of the entire circuit, the phasing and the synchronization are accurate. To detect the case where the synchronization does not take place efficiently, a time-lag signal TS is generated after the success of the phasing operation. Thus, it is assumed that if the synchronization is not done within the limits of this time-lag, there is a failure. This failure could be reported by the transmission of a signal Si towards the exterior of the circuit.

Should the circuit be designed to tolerate N errors and should the delimiter comprise D bits, the value of TS is fixed at a value equal to K+D where K is the number of bits between the (N+1)th edge and the last bit of the preamble.

K has been chosen in this way because because it is recalled that the start of the rephasing square-wave signal can be shifted in an interval between the (N+1)th edge of the preamble and the (4N+1)th edge as a function of the presence of error and jitter.

Figure 11:
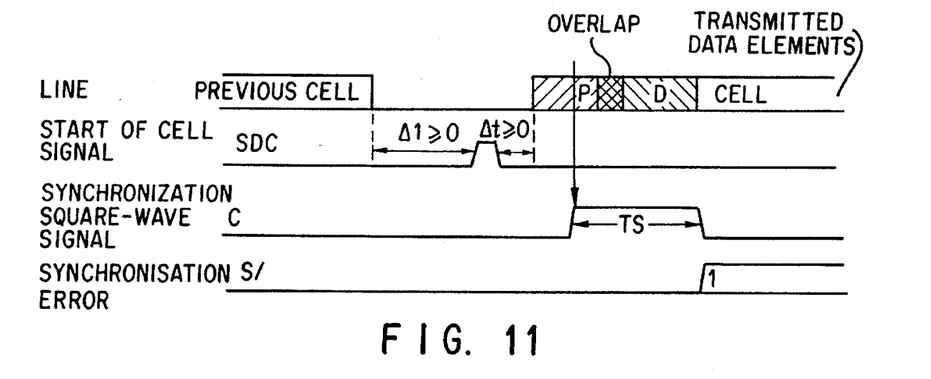
FIG. 11 is a diagram illustrating the resynchronization according to one mode of operation.

For a clearer understanding, reference could be made to diagram of operation shown in FIG. 11, wherein the start-of-cell signal SDC is given from the exterior and wherein the synchronization square-wave signal Cs is limited to a time-lag TS as shown in the figure. The synchronization signal gives a synchronization error signal S/ if the synchronization has failed.

Figure 12:
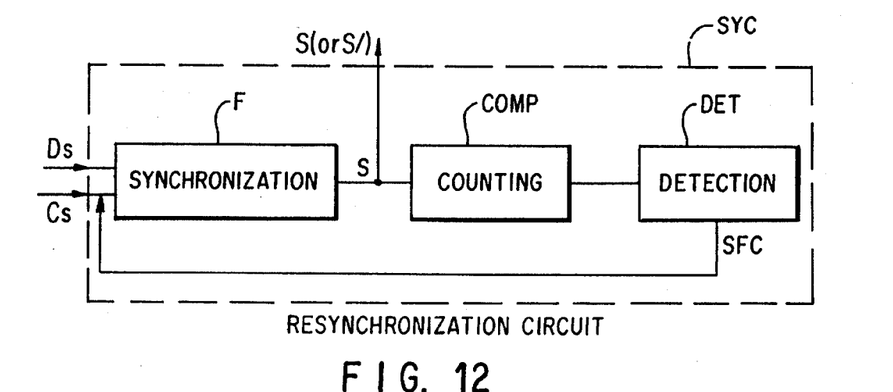
FIG. 12 is a diagram of the structure of the resynchronization circuit according to a variant of the mode of operation.
Figure 13:
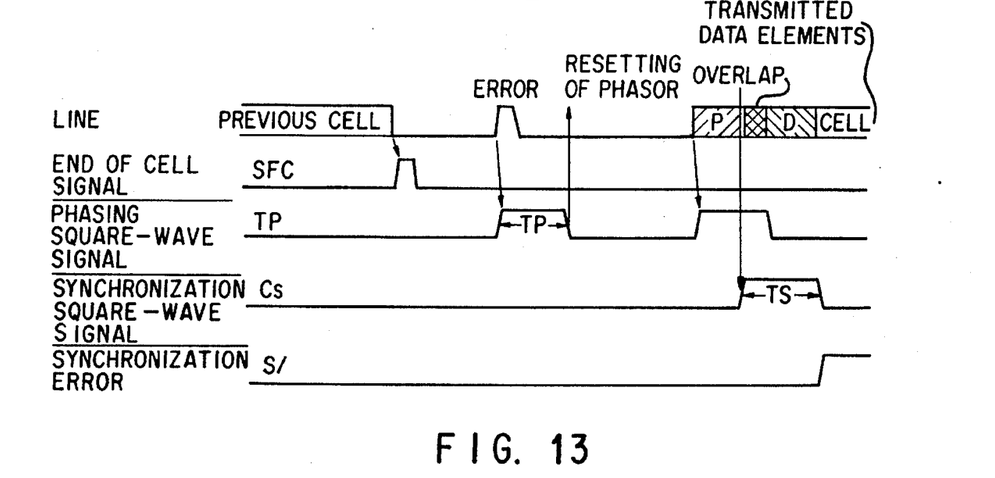
FIG. 13 is a diagram illustrating the resynchronization according to this variant of the mode of operation.

Another variant mode of operation of the entire circuit is possible. Indeed the start-of-cell beep or signal can be replaced by a beep or signal relating to the end of a previous cell. This signal SFC can be generated autonomously by the circuit itself. For this purpose, it suffices to add a counting circuit COMP to the synchronization circuit F (as shown in FIG. 7 for example) this circuit COMP being designed to count the number of bits received, starting from the synchronization. These are the bits of the cell whose number is known. A detector DET of the end of reception of the cell is also added. This detector sends out the end-of-cell beep SFC which triggers the start of the phase search operation for the next cell. This signal is then applied to the input of the synchronization square-wave signal Cs. Reference could be made to the drawing shown in FIG. 12 as well as to the diagram of operation shown in FIG. 13 for a clearer understanding of the invention.

To prevent a situation wherein, when the cells are far too spaced out with respect to one another, possible errors (parasitic positive beeps) between two cells trigger the phasing system, a new time-lag TP is inserted to enable the resetting of the flip-flops of the phasor when the phasing has not been obtained between the first edge received and the end of the time-lag TP. To further improve these results, it is possible to reinitialize the phasor too when the synchronization time-lag TS is exceeded.

What is claimed is:

1. A method of clock signal recovery and synchronization of transmitted data elements at a frequency and in asynchronous temporal transmission mode and occurring in the form of information cells, preceded by a precursor binary data train having edges, said method comprising:

(a) providing a data rephasing and resynchronization circuit for receiving, rephasing, and resynchronizing the transmitted data elements, the data rephasing and resynchronization circuit having a pulsed local clock signal which has a period and frequency, with the frequency of the local clock signal being substantially equal to the transmission frequency of the transmitted data;

(b) receiving at least a precursor binary data train of the transmitted data elements;

(c) generating a number of phase signals from the precursor binary data train with each phase signal delayed from the previous phase signal by a duration equal to the period of the local clock signal divided by the number of phase signals generated;

(d) detecting when one of the phase signals frames at least one pulse of the local clock signal by determining when more than one edge of said phase signal is coherent with a pulse of the local clock signal;

(e) choosing as a data rephasing signal the phase signal framing the local clock signal;

(f) rephasing the transmitted data elements with said data rephasing signal; and (g) recognizing a delimiter in the precursor binary data train to resynchronize the reception of information cells in the transmitted data elements.

2. The method of clock signal recovery and data synchronization according to claim 1 wherein the resynchronization is done with a correction of transmission errors on the precursor binary train and a synchronization square-wave signal is generated during a period of data transmission in which the synchronization word is likely to appear.

3. The clock signal recovery and data synchronization method according to claim 1 wherein the precursor binary train has a preamble and a delimiter that overlap partially.

4. The clock signal recovery and data synchronization method according to claim 1 wherein the precursor binary train has a preamble and a delimiter that overlap entirely.

5. The method of clock signal recovery and data synchronization according to claim 2 wherein the transmitted data elements include a sequence of bits to be rephased and resynchronized, the rephasing and resynchronization circuit being capable of correcting at least a fixed number of errors in the sequence of bits, the precursor including a delimiter having a fixed length, the rephasing and resynchronization circuit utilizing a square-wave signal for recognizing the delimiter in the precursor and during step (g) generating the square-wave signal only if the number of bits in the sequence of bits received by the rephasing and resynchronization circuit to be resynchronized from the rise of the square-wave signal and until the beginning of the delimiter in the sequence of bits differs from the delimiter by a number of bits equal to the sum of at least twice the number of errors the resynchronization circuit is capable of correcting plus one bit.

6. A device for clock signal recovery and for the synchronization of pulsed data elements transmitted in asynchronous temporal transmission mode and occurring in the form of information cells preceded by a precursor binary data train having edges, a preamble and a delimiter, said device comprising:

a) a rephasing circuit, having (1) a pulsed clock signal with a predetermined period and frequency, for receiving and rephasing the transmitted data elements, said rephasing circuit being capable of rephasing the data elements even in the presence of transmission errors, (2) a delay line for generating a predetermined number of phase delayed signals from the precursor data train with each of said phase delays having a duration of time equal to the period of said pulsed clock signal divided by a desired number of predetermined phase delays, (3) means for detecting edges of the precursor data train that are coherent with at least one pulse of said clock signal, and (4) means for correcting errors that appear in the precursor binary data train; and b) a resynchronization circuit having means for recognizing the delimiter in the precursor binary data train and means for correcting errors in the delimiter.

7. The clock signal recovery and data synchronization device according to claim 6 wherein said error correction means of said rephasing circuit include as many flip-flop register stages as there are errors to be corrected with said registers being connected to one another by logic gates so as not to store the detection of an edge of a phase signal of the precursor binary data train unless an edge corresponding to the same phase as a preceding edge has already been stored in the register of the preceding stage.

8. The clock signal recovery and data synchronization device according to claim 7, wherein said rephasing circuit further comprises an edge register that stores an edge of a phase signal of the precursor binary data train only if an edge having the same phase has already been stored in a preceding register stage, the first edge that reaches said edge register determining definitive phasing of the transmitted data elements.

9. The clock signal recovery and data synchronization device according to claim 8, further comprising means for selecting one of said phase signals enabling the rephasing of the data elements.

10. The clock signal recovery and data synchronization device according to claim 9, wherein said phase signal selection means comprises a multiplexer with wired priority (1) preventing the simultaneous propagation of two phases and (2) selecting a phase, of valid phases, that is furthermost to the right or furthermost to the left.

11. The clock signal recovery and data synchronization device according to claim 10, wherein said multiplexer has a pipeline structure having D type flip-flops in order to increase its working frequency.

12. The clock signal recovery and data synchronization device according to claim 10, wherein when the preamble and delimiter overlap, said multiplexer includes storage means at input for storing the bits common to the preamble and the delimiter pending the selection of the appropriate rephasing signal.

13. The clock signal recovery and data synchronization device according to claim 12, wherein said storage means include D type flip-flop registers.

14. The clock signal recovery and synchronization method according to claim 6 wherein said error correcting means of said resynchronization circuit comprises a series recognition register having a length equal to the length of bits of the delimiter and connected by logic gates to a register offset by one bit for each error in the delimiter to be corrected by said resynchronization circuit.

15. The clock signal recovery and data synchronization device according to claim 14, wherein said resynchronization circuit further comprises counting and detection means for enabling the generation of an end-of-cell signal to carry out the synchronization square-wave signal function.

16. A circuit for rephasing and resynchronizing data elements transmitted at a frequency and having an information cell preceded by a precursor binary data train with edges and a preamble and delimiter each having a number of bits, said circuit comprising:

a rephasing circuit having (1) a pulsed clock signal, (2) a delay line for receiving at least the precursor of the transmitted data elements and for generating phase shifted signals from the received precursor, (3) an edge detecting circuit, in communication with said delay line, for detecting more than one edge of at least one of said phase shifted signals that are coherent with said pulsed clock signal, and (4) a multiplexer in communication with said edge detection circuit, said multiplexer (1) selecting from said phase shifted signals having edges coherent with said pulsed clock signal said phase shifted signal furthest phase shifted from any other said phase shifted signals having coherent edges and (2) providing a data element rephased with said pulsed clock signal;

a resynchronization circuit in communication with said rephasing circuit (1) for receiving said rephased data element, (2) for detecting the delimiter in said rephased data element, and (3) having a plurality of flip-flops with at least one flip-flop for each bit of the delimiter to be detected.

17. The rephasing and resynchronizing circuit of claim 16 further comprising a sampling register in communication with said delay line, said multiplexer and said edge detection circuit.

18. The rephasing and resynchronization circuit of claim 16 further comprising a phase determining register in communication with said edge detecting circuit (1) for communicating with said edge detection circuit, (2) for generating a control signal indicating a phase coherent with said clock signal has been determined, and (3) communicating said control signal to said multiplexer to enable said multiplexer to rephase the transmitted data elements.

19. The rephasing and resynchronization circuit of claim 18 wherein said edge detection circuit further comprises (1) exclusive-OR gates for receiving said phase shifted signals, (2) at least one stage of registers for correcting an error in said phase shifted signals, and (3) an edge register for indicating which of said phase shifted signals has edges coherent with said pulsed clock signal.

20. The rephasing and resynchronization circuit of claim 18 further comprising a phase seeking stop circuit in communication with said phase determining register and in communication with said resynchronization circuit for communicating a signal to said resynchronization circuit when one of said phase signals reach said phase determining register, thereby (1) stopping detection of edges coherent with said clock signal and (2) beginning rephasing of the transmitted data elements.

21. The rephasing and resynchronization circuit of claim 19 wherein said edge detection circuit has more than one stage of error correcting registers for correcting more than one error in said phase shifted signals for enabling said edge register to indicate which of said phase shifted signals has edges coherent with said pulsed clock signal despite errors present in the precursor of the transmitted data elements.

22. The rephasing and resynchronization circuit of claim 19 wherein said error correcting register and said edge register are RS type registers.

23. The rephasing and resynchronization circuit of claim 16 wherein said resynchronization circuit comprises a flip-flop for every bit of the delimiter to be detected with each of said flip-flops connected in series for detecting the delimiter in said rephased data element.

24. The rephasing and resynchronization circuit of claim 23 wherein said resynchronization circuit further comprises a plurality of flip-flops connected in series to form a stage of flip-flops for correcting an error in the delimiter with said error correcting stage connected in parallel with said delimiter detecting flip-flops.

* * * * *